United States Patent

[11] 3,624,747

| [72] | Inventors | Charles Allen McKnight<br>2914 Painted Valley Drive, Little Rock, Ark. 72207;<br>Anita L. Gilbert, 4234 East Avalon Drive, Phoenix, Ariz. 85018 |
|---|---|---|
| [21] | Appl. No. | 820,882 |
| [22] | Filed | May 1, 1969 |
| [45] | Patented | Nov. 30, 1971 |

[54] SURGICAL INSTRUMENT FOR RUPTURING MEMBRANES
12 Claims, 6 Drawing Figs.

[52] U.S. Cl. .................................................. 128/361, 128/329, 30/286
[51] Int. Cl. ..................................................... A61b 17/42, A61b 17/34, B26b 29/00
[50] Field of Search .......................................... 30/2, 165, 286, 345, 366; 128/305, 329, 361

[56] References Cited
UNITED STATES PATENTS

| Des. 32,846 | 6/1900 | Casselman | 30/286 X |
| 1,098,578 | 6/1914 | Kent | 30/165 |
| 2,338,007 | 12/1943 | Morris | 30/345 UX |
| 2,676,595 | 4/1954 | Dyekjaer | 128/305 |
| 3,410,269 | 11/1968 | Hovick | 128/361 |

FOREIGN PATENTS

| 813,296 | 9/1951 | Germany | 128/361 |

Primary Examiner—Channing L. Pace
Attorney—Charles B. Haverstock

ABSTRACT: A surgical instrument for rupturing membranes such as the amniotic membrane, said instrument having a head portion that represents an improvement over the head portion of an instrument used for similar purposes covered by copending U.S. Pat. application Ser. No. 656,210, filed July 26, 1967 now U.S. Pat. No. 3,533,411, dated Oct. 13, 1970 by the same inventors. The improved head portion includes means to limit the amount of penetration of the hook portion thereof into the membrane and the subject device is constructed to make it safer to use and to provide more controlled incision of the membrane. The subject instrument is a relatively simple inexpensive instrument preferably of one piece construction and is well suited for packaging in a sterile condition.

PATENTED NOV 30 1971  3,624,747

INVENTORS:
CHARLES ALLEN McKNIGHT
ANITA L GILBERT
BY Charles B. Haverstick
ATTORNEY.

SURGICAL INSTRUMENT FOR RUPTURING MEMBRANES

In the practice of obstetrics it is frequently necessary in order to facilitate the delivery process to rupture the amniotic membrane so that the fluids trapped therein can be expelled. This happens quite often without requiring the help of the attendant doctor and it is only in those cases where the membrane fails to rupture naturally that the doctor is called upon to rupture the membrane. Various devices have been used in the past for rupturing amniotic membranes, many of which have been fashioned and constructed by the doctor from his supply of surgical instruments and from other devices. For the most part, however, the devices that have been used for this purpose have been relatively cumbersome and difficult to operate and use, are not designed for this specific operation, and are relatively expensive and must be resterilized after each use. The known devices are also usually relatively large and often difficult to insert into the vagina, they are difficult to properly locate, and frequently are difficult to manipulate into the best possible position to perform the desired operation. Also most of the known devices are constructed so that they have pointed or sharp end portions which extend in the direction of the fetus and there is therefore considerable possible danger of injury to the fetus from using these devices. Furthermore, if the known devices become accidentally lodged in the fetal or maternal tissue and the operator should then pull outwardly believing he has only hooked the membrane, the tear created and the resulting damage caused could be severe. This could, for example, result in hemorrhaging, infection, scarring, as well as other forms of injury to the fetus and/or to the mother. The possible damage to the fetus might also depend on the position thereof in the pelvis. With the present device, however, should the hook portion by mistake become lodged in the fetal or maternal tissue and the operator pull on the instrument, a small limited penetration and an associated superficial injury might occur rather than a more injurious tear. Also because most of the known devices are not disposable the hospital staff must keep track of them and resterilize them before each use, and this is time consuming and results in problems keeping an available supply of the devices in usable and sterile condition at the location where they are to be used. This also requires considerable staff time, equipment and hospital routine. Some of these limitations and shortcomings are overcome by the instrument disclosed in Applicants' U.S. Pat. No. 3,533,411. The present construction is a further improvement which overcomes these same and other problems principally by limiting the depth that the subject instrument can penetrate through the amniotic membrane, thereby providing an even safer instrument particularly from the standpoint of the unborn fetus. The present invention therefore overcomes more of the disadvantages and shortcomings of the prior art devices and in addition also provides an instrument that is even safer to use than the instrument covered by the Applicants' U.S. Pat. No. 3,533,411.

It is therefore a principal object of the present invention to provide a relatively inexpensive disposable surgical instrument primarily for rupturing the amniotic membrane, which instrument can be operated with a high degree of safety particularly as regards the safety of an unborn fetus and the maternal pelvic tissue.

Another object is to provide improved hook means for a surgical instrument used to rupture the amniotic membrane.

Another object is to provide a relatively simple surgical instrument that can be controlled and manipulated with a high degree of accuracy and can be used in body cavities where the space is very limited.

Another object is to provide a disposable instrument for use in rupturing membranes.

Another object is to simplify hospital routine with respect to the supplying and handling of surgical instruments used in obstetrical cases.

These and other objects and advantages of the present invention will become apparent after considering the following detailed specification which covers a preferred embodiment of the subject device in conjunction with the accompanying drawing, wherein.

Figure 1:
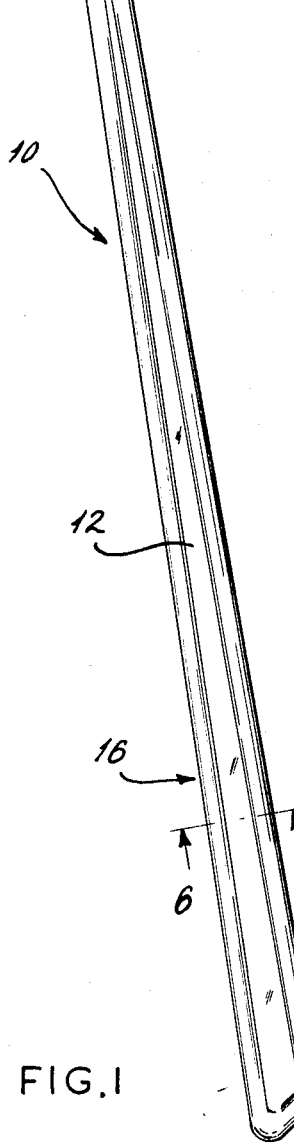
FIG. 1 is a side view of a surgical instrument constructed according to the teachings of the present invention.
Figure 6:
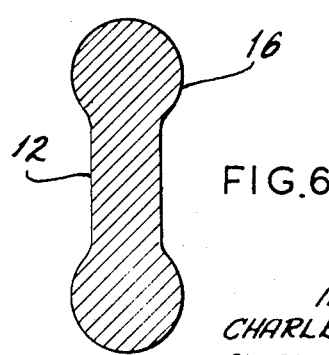
FIG. 6 is a cross-sectional view through the handle portion of the subject device and taken on line 6—6 of FIG. 1.

Referring to the drawing more particularly by reference numbers, number 10 refers to a surgical instrument constructed according to the present invention. The instrument 10 includes an elongated body 12 preferably formed of some relatively inexpensive material such as plastic. The instrument is shown for illustrative purposes as being straight from end to end although it is contemplated that it could be constructed to have a slight bend or bow without changing its basic characteristics. The body 12 also is preferably tapered from end to end having a relatively small head portion 14 at one end and a larger handle portion 16 at the opposite end. One of many possible cross-sectional shapes for the handle portion is shown in FIG. 6. It is to be noted in FIG. 1 that the handle portion has a recess formed in one or both opposite sides to reduce the size and weight of the instrument and also to provide better means for the user to hold and manipulate it. The length of the subject instrument is not critical but it should be long enough so that when it is inserted into a vagina to the depth of the cervix, a convenient length of the handle portion will extend out from the vagina and can be used by the doctor to manipulate the instrument.

The details of the smaller head end portion 14 of the subject instrument are shown in FIGS. 2-5 and include a blunt end surface 18 which is the part of the instrument that moves against the amniotic membrane when the instrument is inserted. The fact that the end surface 18 is made blunt or nearly flat is an important feature of the subject device because it helps to prevent possible injury to an unborn fetus when the instrument is inserted and is moved against the amniotic membrane.

The head end portion 14 of the subject instrument also includes a laterally and to some extent rearwardly (back toward the handle) extending hook portion 20 which is shown as being substantially narrower in width than the width of the rest of the head portion 14. The hook portion 20 is formed into a relatively sharp point or edge at 22 which point or edge terminates on the portion of the hook 20 that extends in a direction more or less back toward the handle portion 16. The hook portion 20 is also formed integrally with a relatively larger portion 24 of the head end 14 and is located centrally widthwise of the instrument. One side of the hook portion 20 is also in alignment with the blunt end surface 18 of the instrument so as to form a curved continuation thereof.

Figure 2:
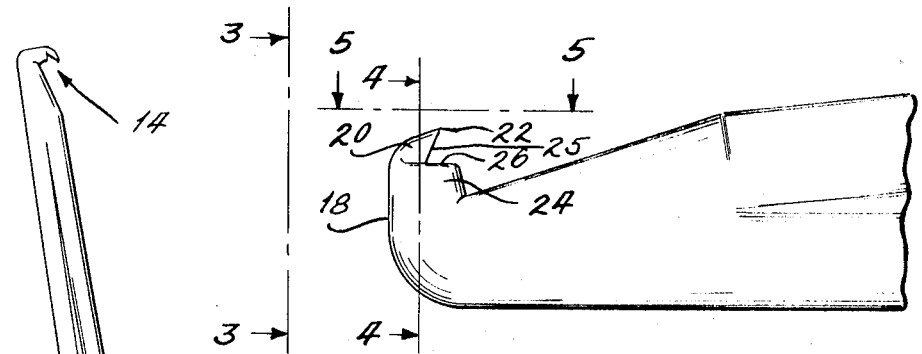
FIG. 2 is an enlarged view showing the details of the head end portion of the instrument of FIG. 1.
Figure 3:
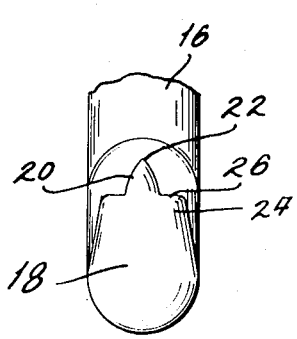
FIG. 3 is an end view of the head end portion of the instrument of FIG. 2 taken on line 3—3 thereof.
Figure 4:
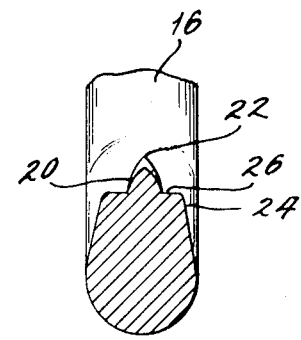
FIG. 4 is a cross-sectional view taken on line 4—4 of FIG. 2.
Figure 5:
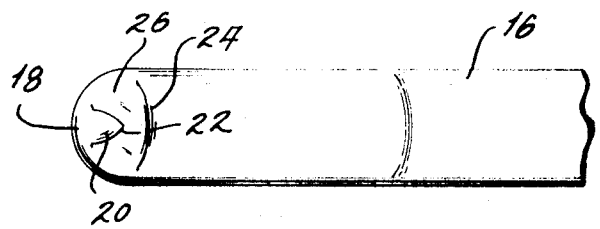
FIG. 5 is another view taken on line 5—5 of FIG. 2.

Extending from the sharp point or edge 22 to where the hook portion 20 joins the larger portion 24 and on the side of the hook that faces the handle 16 is formed a sharp edge 25 (FIG. 2). The reasons for the edge 25 will be explained later.

At a point where the hook portion 20 is joined to the larger portion 24 of the head end 14 a relatively flat area or surface 26 substantially larger in area than the cross-sectional area of the hook at that point forms a shoulder that extends most of the way around the hook 20. The shoulder 26 is important to the present instrument for several reasons including the fact that it limits the depth that the hook 20 can penetrate through the amniotic membrane, and it also helps to control the penetration depth while the instrument is being moved after penetration to prevent the hook from penetrating further while the membraneous sac is being opened. In an actual instrument the hook portion 20 extends only a relatively small distance from the surface 26 in the order of about a 32nd of an inch or so, although this distance can be increased or decreased slightly without changing the basic construction.

The subject instrument is operated by inserting it into the vagina usually directing and guiding the pointed hook portion of the head along the doctor's inserted fingers and into an appropriate position in which the blunt end surface 18 is against the amniotic membrane. Slight pressure of the blunt portion of the end of the device in the direction of the fetus, or fetal scalp, in the case of a normal delivery, is necessary to cause the membrane to bulge immediately ahead of the hook portion so that the membrane will overlap the pointed end of the hook and be snagged thereby. In so doing, the blunt end 18 will be the portion of the instrument closest to the fetus, and the membrane which is snagged and caught on the hook is penetrated by the hook tip and thereafter as the instrument is pulled slightly outwardly away form the fetal scalp the sharp edge 25 of the instrument incises the membrane thereby making an adequate opening to release the fluid from around the fetus. Since the hook 20 faces away form the fetus there is relatively little or no likelihood that it will come in contact with the fetus to cause injury or damage.

The ability of the doctor to manipulate the subject instrument is aided by the fact that the handle portion is relatively flat particularly in the direction or plane of the hook, and this means that the instrument will be relatively rigid in the direction in which the hook is to be moved during rupturing of the membrane thereby providing the doctor with considerably leverage in the operation and manipulation of the subject instrument. The relatively flat shape of the handle in the plane of the hook also helps the doctor to orient the hook when using the instrument which is especially important since the doctor must rely primarily on feel rather than sight when performing this operation. If desired, some means can also be provided on the handle portion of the instrument to indicate to the doctor in which direction the hook is facing. In the embodiment as shown, this is accomplished by having the end of the instrument opposite from the head end 14 formed at an angle.

Thus there has been shown and described novel improvements in a surgical instrument for rupturing membranes which fulfill all of the objects and advantages sought therefor. Many changes, modifications, variations and other uses and applications of the subject instrument will, however, suggest themselves to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A one piece surgical instrument comprising an elongated member having an elongated handle portion with a head portion formed integrally therewith at one end, said head portion having a relatively blunt surface defining one end of the instrument and another relatively flat surface on a side thereof substantially at right angles to the blunt end surface and in a plane substantially parallel to the length of the instrument, and an integral hook member attached to the head portion and extending substantially at right angles to the length of the instrument from said flat side surface adjacent to the blunt end surface, said hook member having a substantially smaller cross-sectional size in the plane where it is joined to the subject side surface than the area of the flat side surface, and said hook member being curved and terminating in a relatively sharply pointed end that extends in a direction generally back toward the handle portion of the instrument, said flat side surface extending outwardly from around at least about half of the hook member to form an abrupt termination thereof and to control the depth that the hook member can penetrate.

2. The surgical instrument defined in claim 1 wherein said hook member has a relatively sharp cutting edge formed thereon extending from the pointed end thereof toward and terminating adjacent to the flat side surface on the head portion, said cutting edge being located on the side of the hook member that faces the handle portion.

3. The surgical instrument defined in claim 1 wherein said hook member is located centrally laterally on the flat side surface and on an extension of the blunt end surface, said flat side surface forming an abrupt termination of the hook member to substantially limit the depth that the hook member can penetrate.

4. The surgical instrument defined in claim 1 wherein said handle portion is gradually tapered from end to end of the instrument being smaller in cross section adjacent to the head portion.

5. The surgical instrument defined in claim 1 wherein said instrument is formed of a plastic substance and wherein said handle portion has a recess formed on at least one side thereof.

6. The surgical instrument defined in claim 1 wherein said flat side surface on the head portion extends around more than one-half of the hook member at the place where the hook member is connected thereto.

7. An instrument for surgically rupturing amniotic membranes in obstetrical cases comprising an elongated plastic member defined by a handle with a membrane-rupturing portion formed integrally at one end of the handle, said membrane-rupturing portion including a first portion which forms an extension of the handle and a second portion attached to the first portion on a side thereof that is in a plane substantially parallel to the length of the handle, said second portion including a generally curved shape hook member having a first larger end and a sharply pointed end opposite the larger end and extending from the larger end thereof adjacent to the one side of the first portion in a direction substantially at right angles to the length of the handle and part way backwardly therefrom toward the handle terminating in said pointed end, the larger end of the hook member being substantially smaller than the said attached one side of the first portion so that the said one side operates to limit the penetration depth of the hook member.

8. The instrument defined in claim 7 wherein the membrane-rupturing portion is formed into a relatively blunt surface on the side thereof opposite from the handle.

9. The instrument defined in claim 8 wherein said hook member has a curved side surface which is formed on an extension of said blunt surface.

10. The instrument defined in claim 7 wherein said hook-shaped member includes a cutting edge formed on the side thereof closest to the handle.

11. An instrument for use in surgically rupturing an amniotic membrane comprising an elongated member defining an instrument handle and a membrane rupturing portion formed integrally with one end of the handle, said membrane rupturing portion having a first end which is connected to the handle, a surface opposite to the first end thereof connected to the handle forming a relatively blunt end surface of the instrument, a relatively blunt side surface formed on one side of the membrane-rupturing portion in a plane substantially parallel to the length of the handle, and a hook portion attached to the blunt side surface and extending therefrom substantially at right angles to the length of the handle and in a direction away from the blunt end surface and terminating in a relatively sharply pointed end, the connection between the hook portion and the said blunt side surface being relatively abrupt such that the side surface operates to limit the depth that the hook portion can penetrate.

12. The instrument defined in claim 11 wherein said hook portion has a relatively sharp cutting edge formed on the side thereof opposite from the blunt end surface of the instrument.

* * * * *